UNITED STATES PATENT OFFICE.

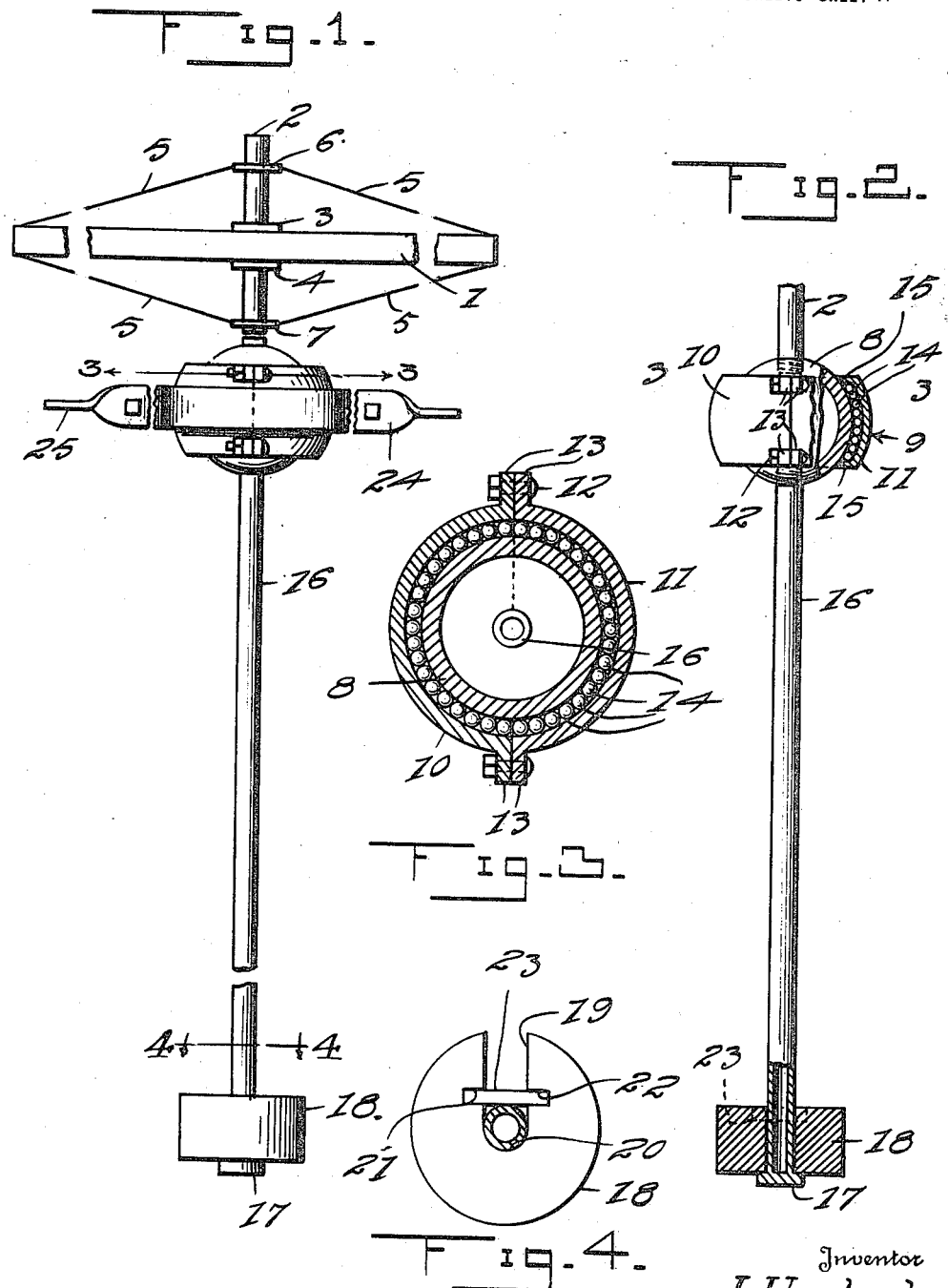

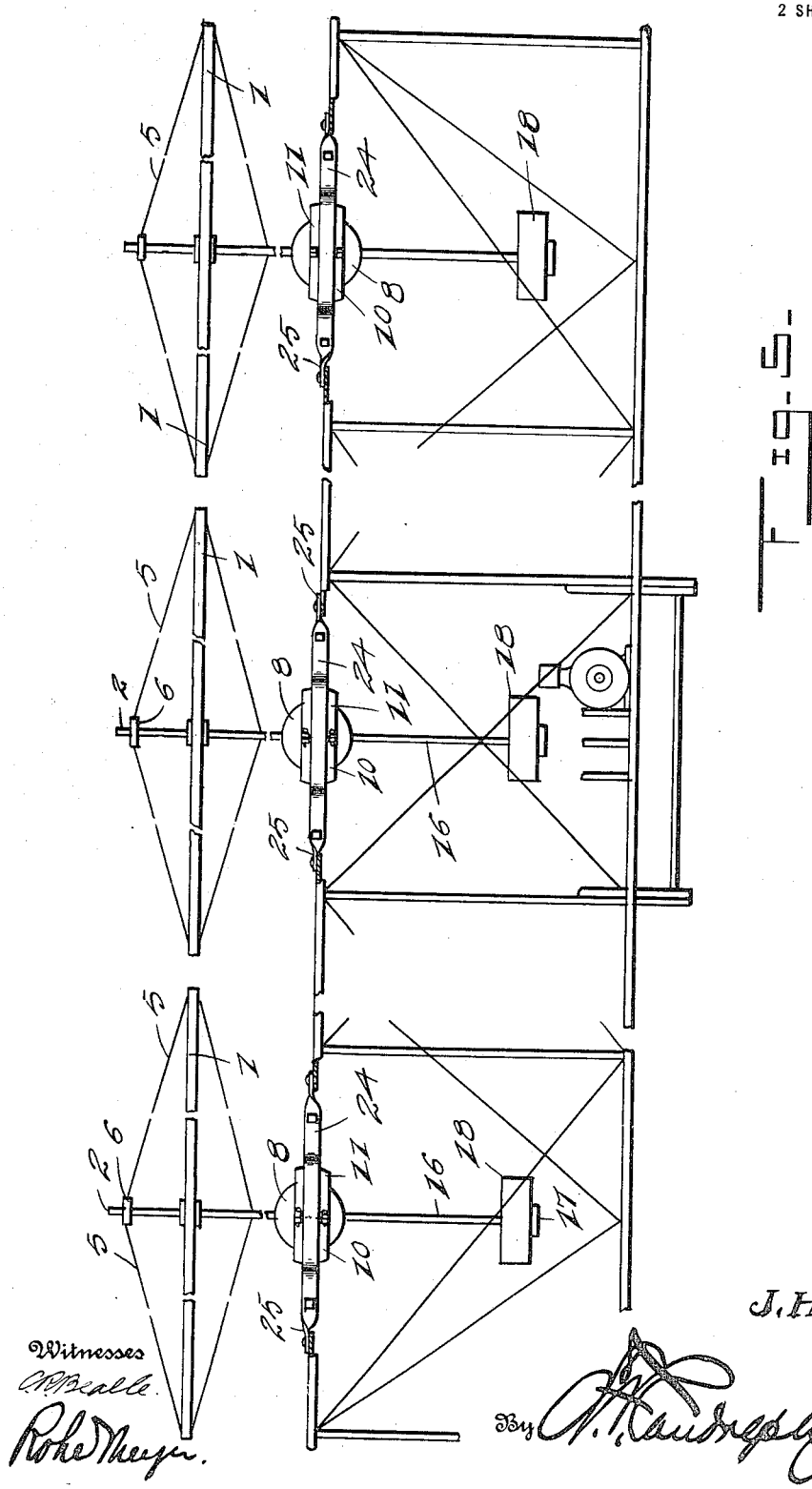

JOSEPH HERBECK, OF LOS ANGELES, CALIFORNIA, ASSIGNOR OF ONE-HALF TO JAMES MACKIN, OF LOS ANGELES, CALIFORNIA.

STABILIZER.

1,178,318. Specification of Letters Patent. Patented Apr. 4, 1916.

Application filed July 15, 1915. Serial No. 40,109.

*To all whom it may concern:*

Be it known that I, JOSEPH HERBECK, a citizen of the United States, residing at Los Angeles, in the county of Los Angeles and State of California, have invented certain new and useful Improvements in Stabilizers; and I do hereby declare the following to be a full, clear, and exact description of the invention, such as will enable others skilled in the art to which it appertains to make and use the same.

This invention relates to gravity stabilizers for use upon aeroplanes or the like and the primary object of the invention is to provide a pendantly hung gravity actuated weight which is connected to a stabilizing plane or wing of an aeroplane at the center of gravity of the plane for equalizing the motion of gravity and stabilizing the wing or plane and the aeroplane.

Another object of this invention is to provide a stabilizer which includes a weight pendantly hung from a revoluble hollow sphere, which sphere is connected directly to a stabilizing wing or plane of an aeroplane and is supported by a shell to permit of the swinging movement of the weight.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a view showing the application of the stabilizer, Fig. 2 is a fragmentary longitudinal section through the stabilizer, Fig. 3 is a cross section on the line 3—3 of Fig. 2, and Fig. 4 is a section on the line 4—4 of Fig. 1. Fig. 5 is a view of a biplane showing the application of stabilizers.

Referring more particularly to the drawings, 1 designates a stabilizing wing or plane adapted for attachment to an airship, aeroplane, or the like, which has a pipe 2 extending vertically through the center of the same. The pipe 2 has collars 3 and 4 mounted thereupon, which are positioned upon opposite sides of and engage the wing 1. The guy wires 5, extend from the corners and ends of the wing 1 and are connected to collars 6 and 7 which are mounted upon the pipe 2, upon opposite sides of the wing, as is clearly shown in Fig. 1 of the drawings.

The pipe 2 has its lower end screwthreadably connected to a hollow sphere 8. The sphere 8 is carried by a bearing 9, which is formed of semi-sections 10 and 11, which are held in engagement with each other, by means of bolts or analogous fastening devices 12, which extend through attaching lugs 13. The bearing sections 10 and 11 have anti-friction ball bearings 14 mounted therein. The sections 10 and 11 have collars 15 formed upon their upper and lower edges, which extend inwardly toward the sphere 8, as is clearly shown in Fig. 2 of the drawings, for preventing the loss of the balls 14.

A length of pipe 16 is detachably connected to the sphere 8, and extends substantially in alinement with the section of pipe 2, from a point diametrically opposite of the connection between the pipe 2 and the sphere 8.

The pipe 16 has a collar 17 mounted upon its lower end, upon the upper surface of which rests the stabilizing weight 18. The weight 18 is provided with a recess 19, which extends radially therein, communicating with an opening 20 formed centrally within the weight, which opening is provided for receiving a section of the length of pipe 16, when the weight is properly mounted thereupon. The weight 18 is provided with a pair of recesses 21 and 22 which extend transversely to the recess 19, beyond the contour of the central opening 20. After the weight 18 has been mounted upon the lower end of the pipe 16, a key indicated at 23 is seated in the recesses 21 and 22, and extends across the radial recess 19, locking the weight 18 upon the pipe 16.

A metallic supporting strap structure 24 extends about the bearing 9, and it has horizontally disposed ends 25, which are provided for resting upon or engagement with any desired portion of the frame structure of the airship, aeroplane or the like.

The pipe 2 is connected to the stabilizing plane or wing 1, at the center of gravity of the same, so that the weight 18, which is mounted upon the dependent or pendantly hanging rod 16 will be positioned beneath the center of gravity of the stabilizing plane. The weight 18 being supported by revoluble sphere 8, will, upon the tilting of the aeroplane upon which the stabilizing plane 1 is mounted, maintain the plane 1 in a horizontal position for equalizing the forces of gravity and stabilizing the aeroplane. The revoluble movement of the sphere 8 is facilitated by the provision of the ball bearings 14, positioned within the shell 9, that support the sphere 8. In applying the improved stabilizer to an aeroplane, one or more of the stabilizing structures may be applied to the aeroplane as is deemed necessary for properly stabilizing the aeroplane.

In reducing the invention to practice, certain minor features of construction, combination, and arrangement of parts may necessitate alteration, to which the patentee is entitled, provided such alterations are comprehended within the scope of what is claimed.

What is claimed is:—

1. In a stabilizer for airships, the combination, of a rotatably supported sphere, a pipe detachably connected to said sphere, a wing fixed to said pipe, a second pipe detachably connected to said sphere at a point diametrically opposite of the connection between said sphere and said first named pipe, and a weight detachably mounted upon the lower end of said second named pipe.

2. In a gravity stabilizer for airships, the combination, of a rotatably supported sphere, a pipe detachably connected to and extending upwardly from said sphere, a wing fixed to said pipe, a second pipe detachably connected to said sphere at a point diametrically opposite of said first named pipe, a collar mounted upon the lower end of said second named pipe, a weight being provided with a radial recess, a pair of transversely extending recesses communicating with said radial recess, and a key inserted in said transversely extending recesses for locking said weight upon the lower end of said pipe.

3. In a gravity stabilizer for airships, the combination of a pipe, a wing fixed to said pipe, guy wires connected to said wing and said pipe, a sphere detachably connected to the lower end of said pipe, means for rotatably supporting said sphere, a second pipe detachably connected to said sphere at a point diametrically opposite of said first named pipe, said second named pipe extending outwardly and downwardly from said sphere, a weight detachably mounted upon the lower end of said last named pipe, and means for holding said weight upon said last named pipe.

4. In a gravity stabilizer for airships, the combination of a pipe, a wing fixed to said pipe, guy wires connected to said wing and to said pipe, a sphere detachably connected to the lower end of said pipe, a pair of members detachably connected for forming a bearing structure, anti-friction ball bearings mounted within said bearing structure and engaging the surface of said sphere, a second pipe connected to said sphere at a point diametrically opposite of said first named pipe, said second named pipe extending downwardly from said sphere, and a weight detachably mounted upon the lower end of said second named pipe.

In testimony whereof I affix my signature in presence of two witnesses.

JOSEPH HERBECK.

Witnesses.
JAMES MACKIN,
JOSEPH J. FLYNN.

Copies of this patent may be obtained for five cents each, by addressing the "Commissioner of Patents, Washington, D. C."